United States Patent
Mizuno et al.

(10) Patent No.: US 7,584,365 B2
(45) Date of Patent: Sep. 1, 2009

(54) STORAGE SYSTEM

(75) Inventors: Makio Mizuno, Sagamihara (JP); Kazuhisa Fujimoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 798 days.

(21) Appl. No.: 11/159,240

(22) Filed: Jun. 23, 2005

(65) Prior Publication Data

US 2006/0259786 A1 Nov. 16, 2006

(30) Foreign Application Priority Data

May 12, 2005 (JP) ............................. 2005-139227

(51) Int. Cl.
*G06F 11/30* (2006.01)
*H04K 1/00* (2006.01)

(52) U.S. Cl. ................... 713/193; 713/189; 380/255

(58) Field of Classification Search ................ 713/189, 713/193; 380/255; 726/34; 365/189.14; 711/100

See application file for complete search history.

(56) References Cited

U.S. PATENT DOCUMENTS

| | | | | |
|---|---|---|---|---|
| 5,010,571 A | * | 4/1991 | Katznelson | 705/53 |
| 5,109,152 A | * | 4/1992 | Takagi et al. | 235/380 |
| 5,608,798 A | * | 3/1997 | Likens et al. | 380/2 |
| 5,643,086 A | * | 7/1997 | Alcorn et al. | 463/29 |
| 5,841,873 A | * | 11/1998 | Lockhart et al. | 713/181 |
| 6,049,611 A | * | 4/2000 | Tatebayashi et al. | 380/44 |
| 6,219,791 B1 | * | 4/2001 | Blanchard et al. | 713/151 |
| 6,522,669 B1 | * | 2/2003 | Karlander | 370/498 |
| 2002/0157011 A1 | * | 10/2002 | Thomas III | 713/193 |
| 2002/0169972 A1 | * | 11/2002 | Tanaka et al. | 713/193 |

FOREIGN PATENT DOCUMENTS

| | | |
|---|---|---|
| JP | 3-172946 | 7/1991 |
| JP | 2002-217887 | 8/2002 |

\* cited by examiner

*Primary Examiner*—Minh Dieu Nguyen
(74) *Attorney, Agent, or Firm*—Brundidge & Stanger, P.C.

(57) ABSTRACT

A storage system encrypts a plain text received from an external device and stores the cryptogram into a disk unit and, thereafter, decrypts the stored data in the disk unit and transmits the decrypted text to the external device. The storage system includes an encryption unit for encrypting first data received from the external device, a decryption unit for decrypting the encrypted data into second data, and a comparison unit for comparing the first and second data. When the first data and the second data are in disagreement, the first data is encrypted by an encryption unit different from the encryption unit encrypted the first data and the encrypted data is decrypted by the decryption unit into third data, whereupon the first data and the third data are compared. When the first data and the third data are also in disagreement, a failure report is sent to the external device.

7 Claims, 3 Drawing Sheets

STORAGE SYSTEM

CROSS-REFERENCES TO RELATED APPLICATIONS

This application relates to and claims priority from Japanese Patent Application No. 2005-139227 filed on May 12, 2005, the entire disclosure of which is incorporated herein by reference.

BACKGROUND OF THE INVENTION

The present invention relates to a storage system capable of encrypting and decrypting data.

As one of the security measures for computer and other systems, there is data encryption technology. (Refer to Japanese Patent Unexamined Publication No. 2002-217887.) A process for performing encryption (hereinafter referred to as "encryption process") or a process for performing decryption (hereinafter referred to as "decryption process") are being achieved by the use of semiconductor parts or software. However, when semiconductor parts are used, there is a possibility of occurrence of a malfunction if the parts are subjected to radiation of alpha ray or the like. Whereas, when software is used, there is a risk of such a trouble as a computing error occurring upon arrival of a specific data pattern.

On the other hand, there are increasing demands for enhancement of security of the storage system itself. Generally speaking, when an external device such as a server transmits data to a storage system, it holds the same data as the transmitted data stored in the main memory or the like of the external device until it is confirmed that the data is normally received by the storage system, and deletes the stored data after the confirmation is obtained. Meanwhile, the storage system, upon receipt of the data transmitted from the external device, temporarily stores the data in a cache memory of its own. The storage system, after obtaining confirmation of the data being normally stored in its own disk device, keeps the data stored in the cache memory for a predetermined period of time and deletes the stored data when the predetermined period has passed. (Refer to Japanese Patent Unexamined Publication No. H03-172946.)

SUMMARY OF THE INVENTION

In view of the above-described technical trends, the data encryption technology is expected hereafter to be applied to the storage system. However, a mere application of the encryption technology to the storage system may give rise to the following problems.

A storage system encrypts data received from an external device, which data is not yet encrypted (hereinafter referred to as "plain text"), and stores the thus encrypted data (hereinafter referred to as "cryptogram") into a disk device within the storage system. Then it decrypts the data stored in the disk device and transmits the thus decrypted data (hereinafter referred to as "decrypted text") to the external device. At this time, the plain text and the decrypted text should naturally be identical when seen from the external device. However, if there has been made a failure in the encryption process or decryption process, the plain text and the decrypted text may become different.

For example, if the failure has been that occurred in the decryption process (due to a fault in the decryption circuit, the decryption program, or the like), the cryptogram, provided that it is properly encrypted cryptogram, can be decrypted back to the plain text by subjecting it to a normal decryption process (by use of another normal decryption circuit or the like). However, in the case where the failure has been that occurred in the encryption process, since it is quite possible that the plain text originally transmitted from the external device has already been deleted, the original plain text cannot be recovered even if the decryption process is performed properly. In other words, seen from the external device, the decrypted text may be a mere meaningless string of letters and, after all, the data is lost.

In order to solve the above-described problem, an exemplary embodiment of the present invention has the following configuration.

A storage system comprises an encryption unit for encrypting first data received from an external device, a decryption unit for decrypting the encrypted data into second data, and a comparison unit for comparing the first data and the second data. When the first data and the second data are not in agreement, a report of failure is sent to the external device. Otherwise, the first data may be encrypted by an encryption unit different from the encryption unit whereby the first data was encrypted and the thus encrypted data may be decrypted by the decryption unit into third data, and thereupon, the first data and the third data may be compared.

Other and further objects, features and advantages of the invention will appear more fully from the following description.

DESCRIPTION OF THE PREFERRED EMBODIMENTS

A preferred embodiment of the present invention will be described with reference to the accompanying drawings.

Figure 1:
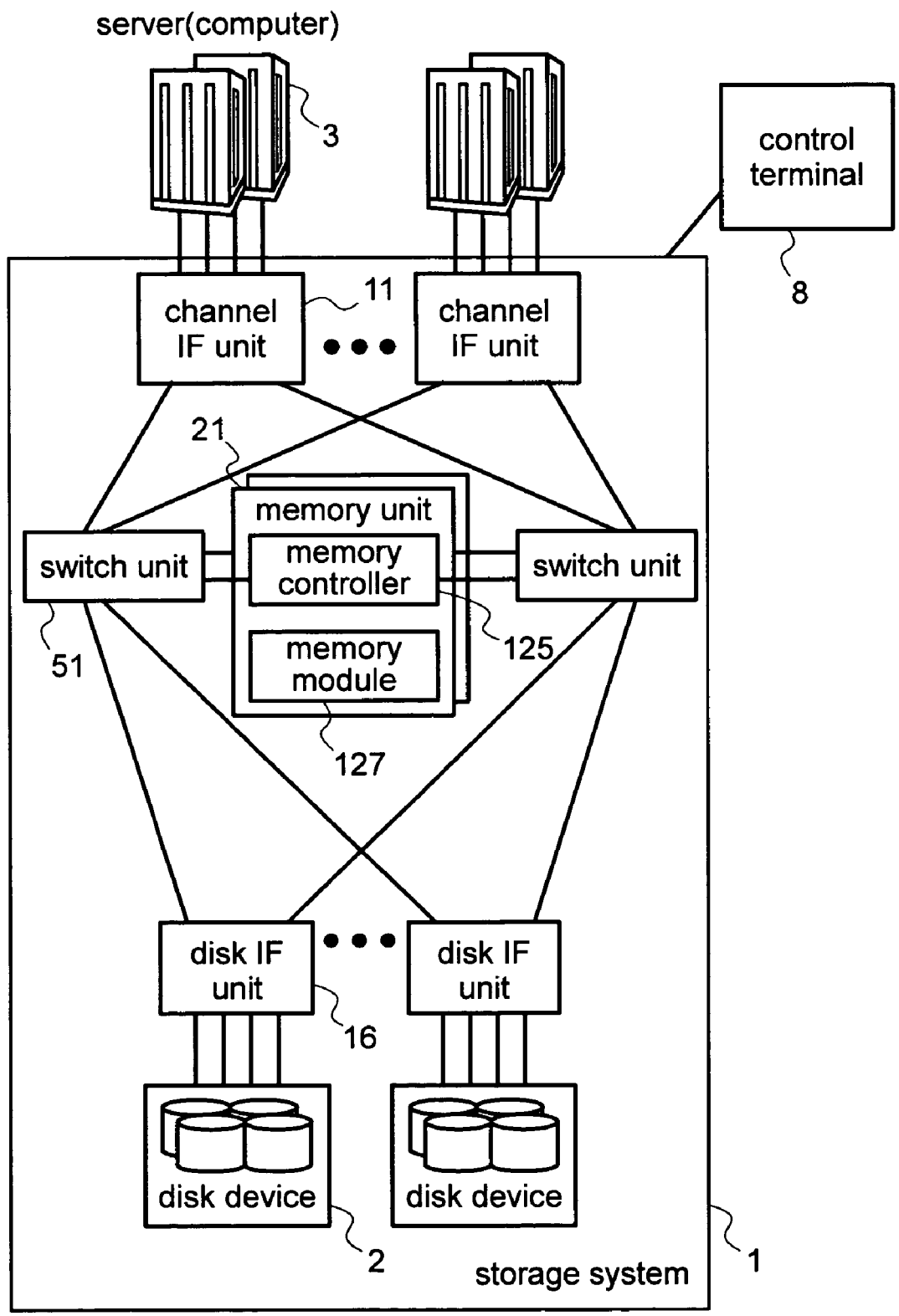
FIG. 1 is a diagram showing an example of a configuration of a computer system.

FIG. 1 is a diagram showing an example of a configuration of a computer system. The computer system is made up of a storage system 1, a server (computer) 3, and a control terminal 8. The storage system 1 and the server 3 are connected with each other via a network.

The storage system 1 is made up of a channel IF unit 11 for transmitting and receiving data to and from the server 3, a disk IF unit 16 for transmitting and receiving data to and from a disk device 2, a switch unit 51, a memory unit 21, and the disk device 2. The channel IF unit 11 and the disk IF unit 16 are connected with the memory unit 21 via the switch unit 51.

The control terminal 8 is connected with microprocessors (hereinafter referred to as "MP") within the channel IF unit 11 and the disk IF unit 16 in the storage system 1 via networks. The control terminal 8 chiefly sets up the configuration of the storage system 1, supervises the system, and collects information about the operating state and failure state of the system, and so on. It also collects, as failure information, a disagreement between a plain text and a decrypted text due to a later discussed trouble of an encryption/decryption unit. From the information collected by the control terminal 8, it can be recognized at which encryption/decryption unit, for example, a trouble has occurred. Hence, it becomes possible to easily identify the part to be replaced. Incidentally, the location of the function of the control terminal 8 is not limited to that described above but it may be located within the server 3, the storage system 1, or on the network.

The present invention is applicable, but not exclusively, to such networks as the IP network and FC network.

The channel IF unit 11, disk IF unit 16, and memory unit 21 are interconnected by two switch units 51 and one each of communication path. The communication path here means a transmission path made up of one or more signal lines for transmitting data/control information. Thus, two transmission paths interconnecting the channel IF units 11, the disk IF units 16, and the memory units 21 can be secured, and thereby reliability on the storage system can be enhanced. Incidentally, the numbers of units and lines mentioned above are not for limitation but for illustration of an embodiment. This rule is applicable to all embodiments which will be discussed hereinafter. Although, in the present embodiment, an example in which the channel IF unit 11, disk IF unit 16, and memory unit 21 are interconnected through the switch unit 51 has been shown, it is enough if the units are interconnected so that data/control information is transmitted over the interconnections. Hence, the units may for example be connected with each other through busses.

The memory unit 21 has a memory module 127 and a memory controller 125. The memory module 127 is logically divided into two domains. One domain is a cache memory domain in which data to be written into disk device 2 or data read out from disk device 2 is temporarily stored. The other domain is a control memory domain in which information for controlling data transfer between channel IF unit 11, disk IF unit 16, and memory unit 21, information for controlling storage system 1, information of the system configuration, and the like is stored. The memory controller 125 controls read/write processes of data from and to the memory module 127. The memory controller 125 also controls transfer of data/control information to and from the channel IF unit 11, the disk IF unit 16, and another memory unit 21.

In general, the storage system stores data received from an external device such as a server into the cache memory and then stores the data into the disk device. As one of the methods, there is a method in which the data stored in the cache memory is stored in the disk device, and thereupon, the completion of the data processing is reported to the external device ("cache write through"). As another method, there is one in which the storage of data into the cache memory and the storage of the data from the cache memory into the disk device are performed asynchronously ("cache write back"). More specifically, at the moment data is stored in the cache memory, the completion of the data processing is reported to the external device and thereafter the data in the cache memory is stored into the disk device. The overall processing time in the latter method becomes shorter than in the former method.

Incidentally, the memory module 127 can be physically divided into two modules, a cache memory module and a control memory module. In this case, the memory controller 125 controls read/write processes of data on the two memory modules independently of each other. Otherwise, the memory controller 125 can be divided into two, i.e., one for controlling the cache memory module and the other for controlling the control memory module. Further, storage of the data/control information into the memory module 127 may be duplicated by use of the two memory units 21 of the storage system 1 (i.e., the data/control information may be duplicated and stored into both of the memory modules 127). Thereby, in case of a malfunction occurring in one memory unit 21, the operation can be continued by use of data stored in the other memory unit 21, and hence the reliability on the storage system 1 can be improved.

Although the disk device 2 is generally formed of magnetic disks, it may also be formed of other storage media such as optical disks, and semiconductor memory devices. Further, the disk device 2 may be of a disk-array configuration or a RAID configuration.

Figure 2:
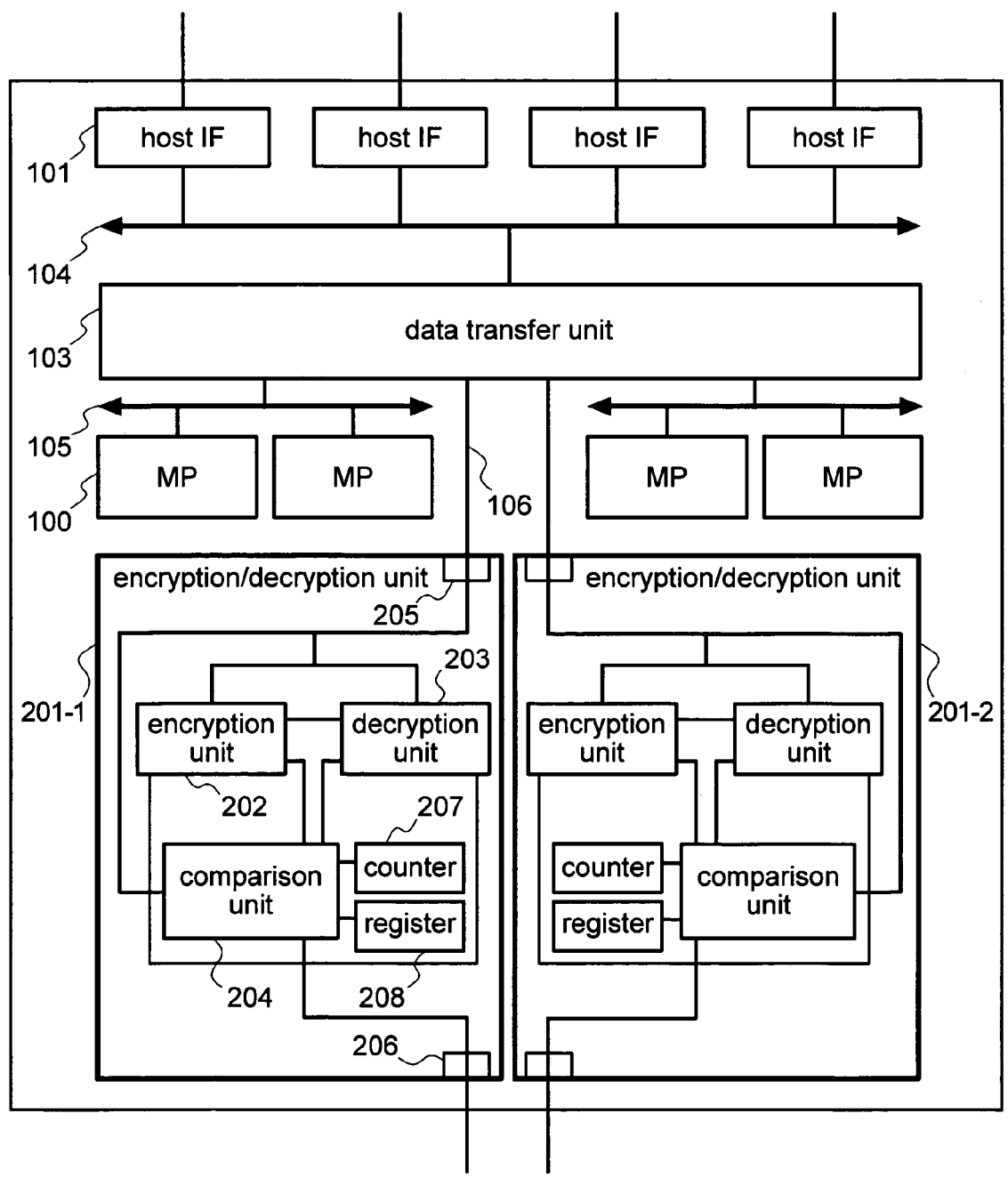
FIG. 2 is a diagram showing an example of a configuration of a channel IF unit.

FIG. 2 is a diagram showing details of the channel IF unit 11.

The channel IF unit 11 includes host IFs 101 for controlling data transfer to and from a server 3, MPs 100 for controlling the channel IF unit 11, a data transfer unit 103 for controlling transfer of data/control information to and from a memory unit 21, and an encryption/decryption unit 201 (201-1, 201-2).

The encryption/decryption unit 201 includes an encryption unit 202 for performing an encryption process, a decryption unit 203 for performing a decryption process, a comparison unit 204, input/output units for inputting and outputting data, a counter 207 for counting the number of errors occurring in the encryption/decryption unit 201, and a register 208 for setting a threshold value of the number of errors. The input/output units are formed of an input/output unit 205 on the side of the data transfer unit 103 and an input/output unit 206 on the side of a switch unit 51.

The host IFs 101 are connected with data transfer unit 103 through a common bus 104. On the other hand, the MPs 100 are connected with the data transfer unit 103 through a common bus 105. Further, the data transfer unit 103 has two transmission paths 106 for establishing connections with two switch units 51 through the encryption/decryption units 201. One encryption/decryption unit 201 is provided for each transmission path 106. Thereby, it is made possible to have the encryption and decryption process performed through each transmission path 106 and hence no contention occurs between the two transmission paths 106. However, a configuration with a single encryption/decryption unit may be made for reduction of the cost of parts.

The MP 100, based on the control information stored in the control memory domain within the memory module 127, controls read/write processing of data on the cache memory domain within the memory module 127, directory control in the cache memory domain, and data transfer between the host IF 101 and the memory unit 21. It further performs such processes, as discussed later, as checking of the result of comparison between a cryptogram and a decrypted text, sending a report of failure to the server 3, the control terminal 8, and the like when the cryptogram and the decrypted text are not in agreement, and so on.

The connecting configuration of the host IF 101, MP 100, encryption/decryption unit 201, and data transfer unit 103 given above is not for limitation but for illustration of an embodiment. It is enough if, at least, the data transfer from the host IF 101 to the memory unit 21 is performed by way of the data transfer unit 103 and the encryption/decryption unit 201. Otherwise, it is enough if the MP 100 is capable of controlling the host IF 101 and data transfer unit 103 and accessing the memory unit 21. Further, it is enough if, at least, there are provided the encryption unit 202, decryption unit 203, and comparison unit 204, which need not necessarily be grouped as the encryption/decryption unit 201. Further, the encryption/decryption unit 201 may be omitted if it is arranged such that the encryption and decryption process is performed only by the disk IF unit 16 as discussed later. Further, the party to and from which the data is transmitted is not limited to the server 3 but it may be any external device connectible to the storage system 1. For example, when a remote copying function is performed, the other party can be another storage system.

Figure 3:
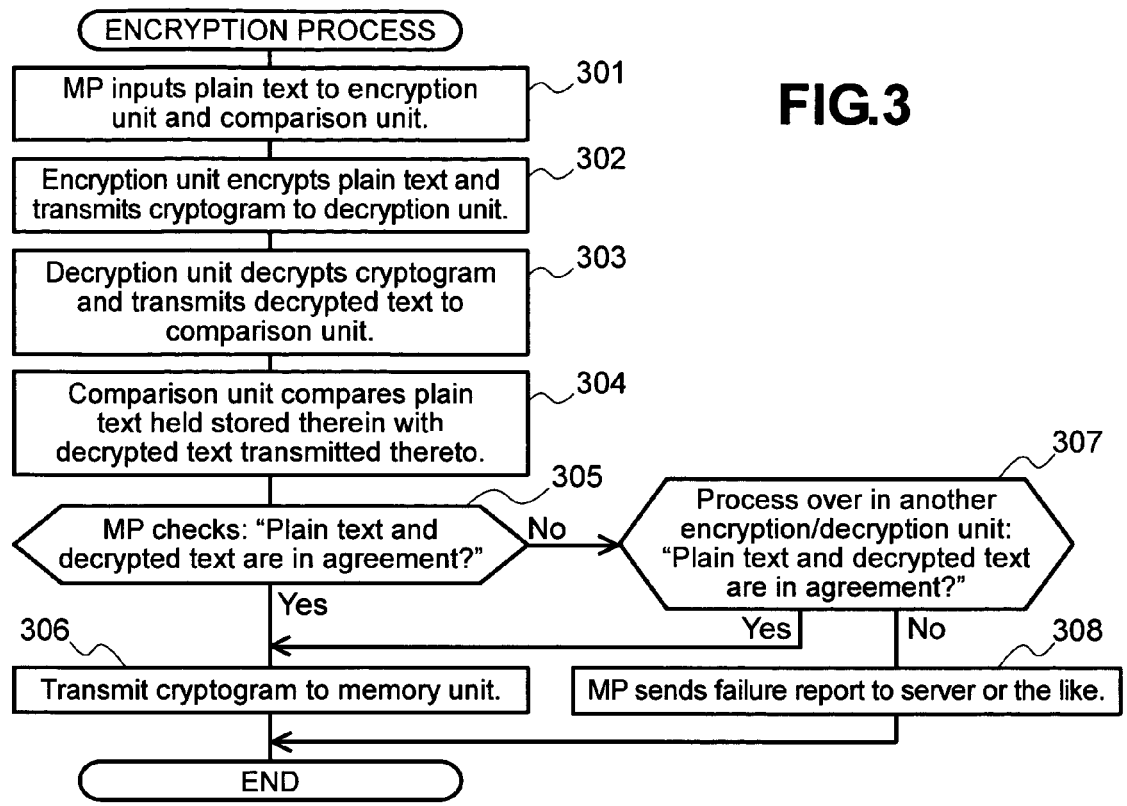
FIG. 3 is a flowchart of an encryption process.

FIG. 3 is a flowchart of an encryption process. The MP 100, in encryption/decryption unit 201-1, allows a plain text transmitted from the server 3 or the like to be passed through the host IF 101 and the data transfer unit 103 so as to be input from the input/output unit 205 to the encryption unit 202 and the comparison unit 204 (step 301). The comparison unit 204 holds the plain text stored therein. Then, the encryption unit 202 encrypts the plain text input thereto and, while holding the cryptogram stored therein, transmits the cryptogram to the decryption unit 203 (step 302). Then, the decryption unit 203 decrypts the cryptogram transmitted thereto and transmits the decrypted text to the comparison unit 204 (step 303). Then, the comparison unit 204 compares the plain text held stored therein with the decrypted text transmitted thereto from the decryption unit 203 (step 304). The MP 100 checks the result of comparison (step 305) and, when both the texts are in agreement, it judges that the encryption has been made correctly and transmits the cryptogram held stored in the encryption unit 202 to the memory unit 21 through the switch unit 51 (step 306). If they are not in agreement, the MP 100 judges that the encryption has not been made correctly and transmits the plain text held stored in the comparison unit 204 to the encryption/decryption unit 201-2, and processing is performed over again in the encryption/decryption unit 201-2 (step 307). If both texts are in agreement here, processing at step 306 is performed, and if they are not in agreement, occurrence of the error is reported to the server 3, the control terminal 8, and the like (step 308).

Although such a circuit as the encryption unit 202 in the encryption/decryption unit 201-1 normally operates well but once in a long while it produces an error. To put it the other way around, even if an error is produced therein, it does not necessarily mean that the circuit is faulty. Hence, such a step may be provided in which it is judged that a fault has occurred in the circuit when such errors have occurred a number of times greater than a predetermined number. Namely, a threshold value of the times of occurrence of errors is set in the register 208 beforehand. The counter 207 counts the number of errors occurred and, at the moment the value has exceeded the threshold value, the MP 100 switches the process over to the encryption/decryption unit 201-2. When the threshold value has been exceeded also in the encryption/decryption unit 201-2, the MP 100 sends a report of failure to the server 3, the control terminal 8, and the like.

The number of the encryption/decryption units 201 is not limited to that mentioned above. For example, when n pieces of the same are used, the n pieces of encryption/decryption units 201 may respectively perform their functions. Then, it may be adapted such that the MP 100 sends a failure report when errors have occurred in all of the n pieces of the encryption/decryption units 201 or, otherwise, such that a failure report is sent out when errors have occurred in a predetermined number of the units.

Further, in such a case where the encryption/decryption processes are performed in the disk IF unit 16 as discussed later, the plain text, not the cryptogram, may be transmitted to the memory unit 21 at step 306 (for example, at the moment it is judged that errors have occurred in a predetermined number of pieces of the encryption/decryption units 201). Then, it is enough if the text has been turned into a cryptogram when the text is finally stored into the disk device 2.

Here, other than the method of comparing data themselves such as the plain text and decrypted text, there is a method of comparing values of a fixed length calculated from the data following a predetermined rule. The value of the fixed length is called a hash value (it is also called "message digest") The hash values assume completely different values in accordance with delicate differences of the original data. This property is used for comparison between the plain text and decrypted text. When it is applied to the flowchart of the encryption process of FIG. 3, the comparison unit 204 calculates a hash value 1 after a plain text has been input to the comparison unit 204 at step 301 and calculates a hash value 2 from a decrypted text at step 303. Then, the hash value 1 is compared with the hash value 2 at step 304. Thereafter, the MP 100 checks the result of comparison at step 305.

When a server 3 or the like has the same function as the encryption/decryption unit used in the present embodiment has, it is possible that data as a cryptogram is transmitted from the server or the like at step 301. In such case, since the text is originally encrypted, it is not necessary to check whether the encryption unit 202 is normal or not. However, by performing a decryption process as discussed later, the decryption unit 203 may be checked whether it is normal. Otherwise, after having the data decrypted once, the above encryption process may be performed to determine whether the encryption unit 202 is normal or not.

When a cryptogram is communicated to and from the server 3 or the like, the encryption key used by the server 3 or the like must have been acquired. Therefore, the encryption keys may have to be exchanged between the system and the server 3 or the like or, otherwise, an outside authentication server may have to be established.

Figure 4:
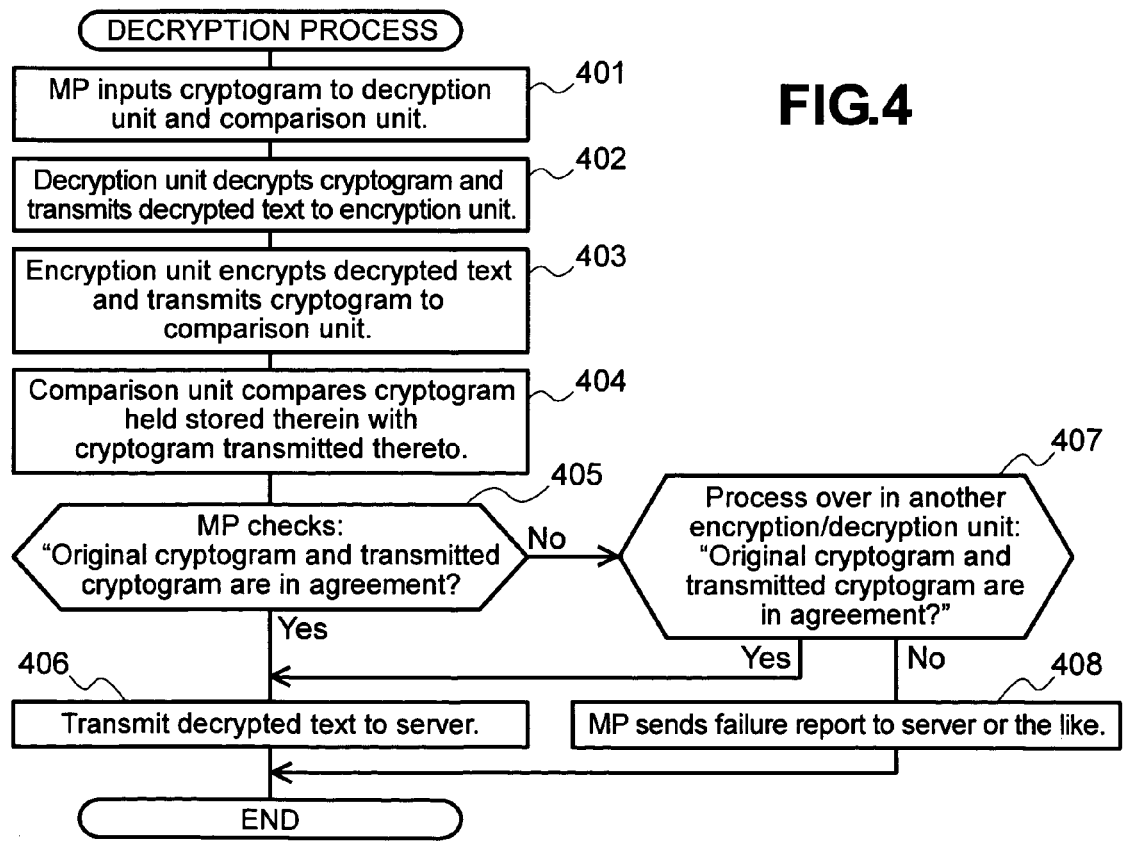
FIG. 4 is a flowchart of a decryption process.

FIG. 4 is a flowchart of a decryption process.

In encryption/decryption unit 201-1, the MP 100 reads a cryptogram out of the memory unit 21 and inputs it to the decryption unit 203 and the comparison unit 204 through the input/output unit 206 (step 401). If, at this time, there is no cryptogram as an object of decryption present in the memory unit 21, the disk IF unit 16 reads a cryptogram out of the disk device 2 and writes it into the memory unit 21, and thereafter the MP 100 reads out the cryptogram from the memory unit 21. The comparison unit 204 holds the cryptogram stored therein. Then, the decryption unit 203 decrypts the input cryptogram and, while holding the cryptogram stored therein, the decryption unit 203 transmits the decrypted text to the encryption unit 202 (step 402). Then, the encryption unit 202 encrypts the decrypted text transmitted thereto and transmits the cryptogram to the comparison unit 204 (step 403). Then, the comparison unit 204 compares the cryptogram held stored therein and the cryptogram transmitted thereto from the encryption unit 202 (step 404). The MP 100 checks the result of comparison (step 405), and if both are in agreement it determines that the decryption has been performed correctly and allows the decrypted text stored in the decryption unit 203 to be transmitted to the server 3 through the data transfer unit 103 and the host IF 101 (step 406). If both the texts are not in agreement, the MP 100 determines that the decryption has not been correctly performed and thereupon it transmits the cryptogram held stored in the comparison unit 204 to the encryption/decryption unit 201-2 and have the cryptogram processed over again in the encryption/decryption unit 201-2 (step 407). If both texts are in agreement here, the process at step 406 is performed and, if they are not in agreement, occurrence of the error is reported to the server 3, the control terminal 8, and the like (step 408). Processes to be performed when n pieces of encryption/decryption units 201 are provided are the same as in the flow of encryption process. Incidentally, when the server 3 or the like has the same function as the encryption/decryption unit described in the present processing has, a cryptogram gone through checking as it is may be transmitted to the server 3 or the like at step 406.

In this case, the same as in the encryption process, comparison with the use of hash values may be carried out. When applied to the flowchart of decryption process of FIG. 4, after a cryptogram is input to the comparison unit 204 at step 401, the comparison unit 204 calculates a hash value 1 and calculates a hash value 2 from the cryptogram at step 403 and then compares the hash value 1 and the hash value 2 at step 404. Then, MP 100 checks the result of comparison at step 405.

Although the method of comparison with the use of data themselves and comparison with the use of hash values have been described in the present embodiment, the methods of comparison are not limited to these.

The above described encryption and decryption process may be carried out by the disk IF unit 16. The time point at which encryption processing is made, for example, is when the data received from a server 3, after it is once stored in the memory module 127, is stored into the disk device 2. The configuration of the disk IF unit 16 is substantially the same as that of the channel IF unit 11, and hence it is not shown in the figure. Its difference from the channel IF unit 11 is that, while the host IF 101 controls the data transfer to and from the external devices such as the server 3, its portion corresponding to the host IF 101 (disk IF) controls data transfer to and from the memory unit 21 through the switch unit 51. Further, while the input/output unit 206 of the channel IF unit 11 is connected with the memory unit 21 through the switch unit 51, the input/output unit of the disk IF unit 16 is connected with the disk device 2.

The above described processes may be performed by both or only by one of the channel IF unit 11 and the disk IF unit 16. Namely, various variations such as, for example, having the encryption process performed only by the channel IF unit 11 and the decryption process performed only by the disk IF unit 16 can be considered. Processes at steps 306 and 406 may vary depending on the variations. For example, when the encryption process is performed in both of the channel IF unit 11 and the disk IF unit 16, the channel IF unit 11 will transmits a plain text to the memory unit 21 (while the disk IF unit 16 transmits a cryptogram to the disk device 2). Otherwise, when the decryption process is performed in both of the channel IF unit 11 and the disk IF unit 16, the disk IF unit 16 will transmit a cryptogram to the memory unit 21 at step 406 (while the channel IF unit 11 transmits a decrypted text to the server 3).

Although the description in the above has been given on the premise that the encryption unit 202 and the decryption unit 203 are logical circuits independent of each other, they may be arranged into an encryption/decryption unit as an integral logical circuit. However, if a failure occurs in this case, the functions performing encryption and decryption are both affected. Therefore, when the processes as described above are performed, a plain text and a decrypted text obtained by encryption and decryption of the original text will come to be apparently in agreement. Then, it becomes impossible to detect a failure in the encryption/decryption unit.

Accordingly, a plurality of encryption/decryption units may be prepared and further a failure detection unit for detecting a failure in an encryption/decryption unit may be provided. In the event that the results of encrypting and decrypting processes performed by respective encryption/decryption units are not in agreement, it is determined that a failure has occurred at least in one of the encryption/decryption units. Further, when three or more of encryption/decryption units are used, if only one encryption/decryption unit of them gives a result different from the results of the rest of them, it is then determined that a failure has occurred in the encryption/decryption unit giving the result different from the rest. Thereupon, the MP sends a report of failure to such external devices as the server and the control terminal. Incidentally, a counter may be provided as in the above-described example so that a report of failure may be made when errors have occurred over a predetermined number of times.

In the above embodiments, the encryption unit, the decryption unit, the comparison unit, the encryption/decryption unit having an encryption unit and an decryption unit integrated therein, the failure detection unit, and soon have been described as provided by hardware. However, they may be realized by programs. For example, a memory unit for storing programs may be provided within the channel IF unit 11 so that encryption programs, decryption programs, comparison programs, and so on are stored therein. By allowing the MP to execute these programs, the processes as described above can be performed. The same arrangement can also be realized in the disk IF unit. Such programs can be furnished as stored in a storage medium (such as a CD-ROM) capable of being read by a computer. It is also possible that such programs are furnished over networks such as the Internet.

According to the present invention, a disagreement between a decrypted text and a plain text due to a failure in the encryption unit can be prevented from occurring.

What is claimed is:

1. A storage system connected to an external device comprising:
   a first encryption unit;
   a second encryption unit;
   a first decryption unit;
   a second decryption unit;
   a comparison unit;
   a counter for counting a number of errors of an encryption in the first encryption unit; and
   a control unit,
   wherein
   the first encryption unit receives a first data from the external device and encrypts the first data;
   the first decryption unit decrypts the encrypted first data into second data; and
   the comparison unit compares the second data with the first data,
   the control unit switches over from the first encryption unit to the second encryption unit, if the first data and the second data are not in agreement in the comparison, so that the second encryption unit encrypts the first data and the second decryption unit decrypts the encrypted first data encrypted by the second encryption unit into third data,
   the comparison unit compares the third data with the first data, and
   if the number of errors is greater than a predetermined number, the control unit executes the switch over without finally determining if there is agreement between the first data and the second data.

2. A storage system according to claim 1, wherein
   a report of failure is sent to the external device when the first and the second data are not in agreement.

3. A storage system according to claim 2, further comprising;
   a control terminal for supervising the storage system, wherein
   the report of failure is sent to the control terminal.

4. A storage system according to claim 1, wherein
   the comparison unit, based on the first and the second data, calculates their respective first and second hash values and compares the first and the second hash values.

5. A storage system according to claim 1,
wherein the comparison unit compares fourth data decrypted by the second decryption unit and the first data.

6. A storage system according to claim 5, wherein a report of failure is sent to the external device when the first data and the fourth data are not in agreement.

7. A storage system according to claim 6, further comprising;
a control terminal for supervising the storage system, wherein
the report of failure is sent to the control terminal.

* * * * *